United States Patent Office
3,303,179
Patented Feb. 7, 1967

3,303,179
ALPHA-OLEFIN POLYMERIZATION IN THE PRESENCE OF ALKYL ALUMINUM DIHALIDE, TiCl₃, AND TRIETHYLAMINE DIAMINE
James L. Jezl, Swarthmore, and Habet M. Khelghatian, Springfield, Pa., and Louise D. Hague, Wilmington, Del., assignors to Avisun Corporation, Philadelphia, Pa., a corporation of Delaware
No Drawing. Filed June 4, 1963, Ser. No. 285,241
The portion of the term of the patent subsequent to July 30, 1980, has been disclaimed
8 Claims. (Cl. 260—93.7)

This invention relates to a novel catalyst system for the polymerization of propylene and higher 1-alkenes having no branching at the 2 position, and more particularly to a catalyst system prepared by mixing a titanium halide, an aluminum alkyl dihalide, and triethylene diamine in an inert hydrocarbon reaction medium.

This application is a continuation-in-part of our copending application, Serial Number 99,677, filed March 31, 1961, and now abandoned.

It is known that 1-alkenes may be polymerized in the presence of two-component catalysts formed by mixing, in an inert reaction medium, a transition metal halide such as titanium tetrachloride or titanium trichloride and an aluminum trialkyl or dialkyl aluminum halide. The chief product of such polymerization is a crystalline polymer having utility in the fabrication of molded articles, films, and fibers. However, it has not been found possible heretofore to use an alkyl aluminum dihalide as the organometallic compound in this type of catalyst system. Thus, Stuart and Khelghatian show in U.S. Patent 2,967,206 that no solid polymers are formed when propylene or higher 1-olefins are contacted with a catalyst consisting of titanium trichloride and aluminum ethyl dichloride, although some oily polymers are formed. If the titanium trichloride is activated as hereinafter described, some solid polymer will be formed, but the rate of polymerization is extremely slow.

It is an object of this invention to provide a coordination complex catalyst comprising an aluminum alkyl dihalide as the organometallic component of the catalyst which will polymerize propylene and higher 1-alkenes to solid crystalline polymers at commercially attractive rates.

It has been found according to the present invention that a catalyst system formed by mixing an alkyl aluminum dihalide, triethylene diamine, and certain types of titanium chloride, in an inert reaction medium, is effective in polymerizing propylene and other 1-olefins to solid crystalline polymers. The types of titanium chloride useful in the practice of the invention include titanium trichloride made by reducing titanium tetrachloride with aluminum, and activated by grinding until, as determined by X-ray diffraction, it possesses less than 30% of the crystallinity exhibited by the unground material, and preferably less than 10%; the entire reaction product obtained by mixing, in an inert hydrocarbon, titanium tetrachloride and an aluminum alkyl dichloride in a mol ratio of aluminum alkyl dichloride to titanium tetrachloride of at least one; and the solid reaction product obtained by reacting titanium tetrachloride and an aluminum alkyl dichloride, which has been further acivated by dry grinding. Other forms of titanium chlorides, such as the unactivated aluminum or hydrogen reduced titanium trichloride, or an activated hydrogen reduced titanium trichloride or the reaction products of titanium tetrachloride and an aluminum trialkyl or aluminum dialkyl chloride, when mixed with an aluminum alkyl dihalide and triethylene diamine, yield catalyst systems which, when operable to a certain extent, do not produce crystalline polymers at commercially acceptable rates. In the case of propylene, the minimum acceptable commercial rate is about 0.4 pound of polymer per gallon of reaction mixture per hour.

The aluminum component of the catalyst system may be any alkyl aluminum dihalide such as ethyl aluminum dichloride, propyl aluminum dichloride, isobutyl aluminum dichloride, or the corresponding bromine or iodine compounds, as well as alkyl aluminum dihalides which contain greater numbers of carbon atoms in the alkyl groups. The mol ratio of alkyl aluminum dihalide to titanium in the catalyst system should be from about 0.5:1 to 10:1, preferably from 1.2:1 to 5:1.

The triethylene diamine used in our new catalyst systems is a bicyclic compound having the formula:

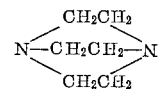

The mol ratio of free alkyl aluminum dihalide to triethylene diamine in the catalyst system should be from about 1.5:1 to 10:1, preferably from about 2:1 to 4:1.

In carrying out polymerizations in accordance with the present invention, the catalyst components are dissolved or suspended in an inert hydrocarbon solvent such as hexane, heptane, or octane, or mixtures thereof, in a reactor equipped with stirring means in the absence of oxygen, moisture, or other polar compounds. The catalyst and solvent mixture is then brought to a temperature of from 25° C. to 150° C., preferably from 60° C. to 80°C., and the monomer to be polymerized is introduced into the reaction vessel. When the monomer is a liquid at reaction temperatures, such as 4-methyl-pentene-1, the reaction may take place at atmospheric pressure, but when the monomer is gaseous at reaction temperatures, such as propylene or butene-1, moderately elevated pressures are used, preferably from 20 p.s.i.g. to 500 p.s.i.g., in order to increase the amount of monomer dissolved in the solvent, and thus speed the reaction.

In order that those skilled in the art may more fully understand the nature of our invention and the method of carrying it out, the following controls and examples are given. The various titanium compounds used are identified as follows. A TiCl₃ is the crystalline product recovered by reducing TiCl₄ with aluminum, and has the composition TiCl₃·⅓AlCl₃. AA TiCl₃ is A TiCl₃ which has been activated by grinding in a ball mill until the crystallinity, as measured by X-ray diffraction, has been reduced to less than 10% of that of A TiCl₃. H TiCl₃ is the product obtained by reducing TiCl₄ with hydrogen, and HA TiCl₃ is H TiCl₃ activated in the same manner as AA TiCl₃. ER TiCl₃ is the product obtained by reducing TiCl₄ with an excess of ethyl aluminum dichloride, and has the formula TiCl₃·AlCl₃, and ERA TiCl₃ is ER TiCl₃ which has been further activated by grinding in a vibrating ball mill for a period of two hours.

CONTROL 1

A heavy-walled glass polymer bottle having a capacity of 185 mls. was charged with 50 ml. of heptane, 1.0 ml. of a 1.78 M solution of ethyl aluminum dichloride in heptane, and 0.139 gram of AA TiCl₃. The bottle was sealed with a crown cap containing an oil resistant liner, and fitted with an inlet for the monomer to be polymerized. The bottle was then placed in a constant temperature bath at 72° C. The contents of the bottle were maintained in agiation with a Teflon-coated magnetic stirrer. After aging for 10 minutes, the bottle was pressured with 40 p.s.i.g. of propylene, which pressure was maintained for 4 hours. The bottle was then vented, and the catalyst was killed with 25 ml. of isopropanol and 50 ml. of methanol. The yield of solid polymer was 0.1 gram.

CONTROL 2

The procedure of Control 1 was repeated, substituting 13.2 g. of 4-methylpentene-1 for the propylene. After 22 hours' reaction time, 5.9 g. of polymer were recovered, only 6.8% of which was pentane insoluble.

CONTROL 3

2500 cc. of hexane were charged to a reactor, together with 14.1 cc. of 23.8 vol. percent ethyl aluminum dichloride, 1.37 grams of triethylene diamine, and 1.73 grams of A $TiCl_3$. The $TiCl_3$ amounted to 0.053 gram per 100 cc., and the ratio of aluminum to titanium to triethylene diamine was 3.8:1:1.42. The contents of the reactor were brought to a temperature of 160° F., and hydrogen was added in the amount of 22 parts by million by weight, based on the weight of the hexane. Propylene was then admitted to the reactor at a partial pressure of 100 p.s.i.g., and the pressure and temperature were maintained over a period of two hours. The reaction was then killed by the addition of methanol, and the pentane-insoluble portion of the polymer was recovered by filtration. It was found that pentane-insoluble polypropylene had been formed at the rate of 0.02 pound per gallon of hexane per hour.

CONTROL 4

The procedure of Control 3 was followed, substituting for the A $TiCl_3$ 1.9 grams of the solid product formed by reacting $TiCl_4$ with diethyl aluminum chloride. The rate of formation of pentane-insoluble polymer was 0.13 pound per gallon of hexane per hour.

CONTROL 5

The procedure of Control 3 was followed substituting 1.33 g. of HA $TiCl_3$ for the A $TiCl_3$ of that control. The rate of formation of pentane-insoluble polymer was 0.15 pound per gallon of hexane per hour.

Example I

A polymer bottle was charged with 50 ml. of heptane, 1.0 ml. of 1.78 M heptane solution of ethyl aluminum dichloride, and 50.5 milligrams of triethylene diamine. The bottle was then capped and agitated in the 72° C. bath for 30 minutes. The bottle was then cooled and opened and 0.139 g. of AA titanium trichloride was added. The mol ratio of ethyl aluminum dichloride to titanium trichloride to triethylene diamine was 2.0:1.0:0.5. The bottle was then recapped, put back in the 72° C. bath, and the catalyst was aged for 10 minutes. The bottle was then pressured with propylene to 40 p.s.i.g., and this pressure was maintained for 4 hours while agitating the contents of the bottle. The catalyst activity was then killed by the addition of 10 ml. of methanol and 50 ml. of heptane. The polymer was collected on a sintered glass funnel and washed successively with 50 ml. of heptane, 50 ml. of isopropanol, 100 ml. of water, and 100 ml. of methanol. It was then dried in a vacuum oven for 16 hours at 60° C. The solid polypropylene recovered weighed 15.5 grams, 92.9 weight percent of which was pentane-insoluble.

Example II

Example I was repeated using a mol ratio of aluminum to titanium to triethylene diamine of 2.0:1.0:0.75. The yield of solid polymer was 16.2 grams, 96.9 weight percent of which was insoluble in pentane.

Example III

Example I was repeated at an ethyl aluminum dichloride:titanium trichloride:triethylene diamine mol ratio of 2.0:1.0:0.75. Moreover, 13.2 g. of 4-methylpentene-1 were substituted for the propylene of Example I and the polymerization reaction was run for 16 hours. There resulted 5.4 g. of poly-(4-methylpentene-1), 94.4 weight percent of which was insoluble in pentane.

Example IV

Example I was repeated using 0.154 g. of titanium trichloride and sufficient ethyl aluminum dichloride and triethylene diamine to provide an ethyl aluminum dichloride:titanium trichloride:triethylene diamine mol ratio of 2.0:1.0:0.25. There resulted 4.9 g. of solid pentane-insoluble polypropylene. On the other hand, when the foregoing procedure was repeated with no triethylene diamine at an Al:Ti mol ratio of 1.8:1.0, there resulted only 0.06 g. of solid pentane-soluble polypropylene.

Example V

A water-jacketed polymerization reactor was charged with n-hexane, AA titanium trichloride, ethyl aluminum dichloride and triethylene diamine in quantities such that the hexane contained 0.07 g. of titanium trichloride per 100 cc. and the aluminum to titanium to triethylene diamine mol ratio was 2.6:1.0:0.65. Anhydrous and oxygen-free conditions were maintained during the addition of the catalyst system and during the polymerization stage. Twenty-two p.p.m. by weight of hydrogen, based on the weight of the hexane, followed by propylene were introduced into the reactor until the pressure reached 140 p.s.i.g. and the propylene content of the hexane was 38 mol percent. The temperature was increased to 160° F., at which point polymerization commenced and was continued for 1.23 hours while continuously introducing propylene into the reactor in sufficient quantities to maintain the pressure at 140 p.s.i.g. At the end of this time period, the unconsumed propylene was vented and methanol was added to inactivate the catalyst system. Upon working up the reaction product, it was found that 95.2 weight percent of the polymer produced was insoluble in pentane and that the rate of formation of pentane-insoluble polypropylene was 0.53 pound of polymer per gallon of hexane per hour. In contrast to this example, when the triethylene diamine was omitted, 39.8 weight percent of the polymer produced was soluble in pentane and the rate was 0.009 lb./gal./hour.

Example VI

A reactor was charged with 2500 cc. of hexane, 14 cc. of 23.8 vol. percent ethyl aluminum dichloride, 1.37 grams of triethylene diamine, and 2.5 grams of ER $TiCl_3$. The ER $TiCl_3$ was prepared by reducing a solution of $TiCl_4$ in hexane with ethyl aluminum dichloride in a 1:2.4 mol ratio, filtering the solids formed from the solution, washing the solids with hexane and drying. The ratio of aluminum to titanium to triethylene diamine was 3.8:1:1.42, disregarding the aluminum co-crystallized with the titanium trichloride, and the ER titanium trichloride was present in the amount of 0.10 gram per 100 cc. of hexane. The reactor was then brought to a temperature of 160° F., and 22 parts by million of hydrogen, based on the weight of hexane, was added. The reactor was then pressured to 100 p.s.i.g. partial pressure of propylene, and polymerization was continued until 300 cc. of propylene, as a liquid, had been consumed. In this instance, the time was 50 minutes. On working up the product, it was found that propylene had been polymerized at the rate of 0.51 pound per gallon of hexane per hour.

Example VII

Example VI was repeated, except that the ratio of aluminum to titanium to triethylene diamine was 3.8:1:1.89. The rate of polymerization was 0.40 pound per gallon per hour.

Example VIII

Example VI was repeated, substituting 1.73 gms. AA $TiCl_3$ for the ER $TiCl_3$ used in Example VI. The rate of polymerization was 0.54 pounds per gallon of hexane per hour.

Example IX

Example VI was repeated, except that the triethylene diamine was first dissolved in 100 cc. hexane, added to an ethyl aluminum dichloride solution in hexane of 23.8 vol. percent concentration and aged at 70° C. for one-half hour. The ER TiCl₃ was then added, and the mixture was aged at 70° C. for an additional half hour. The resultant slurry was then charged to the reactor and was used to polymerize proplyene in the manner described in Example VI. The catalyst level and the ratio of catalyst components were the same as in Example VI. The rate of polymerization was 0.63 pound per gallon per hour. A repeat run in which the ethyl aluminum dichloride and ER TiCl₃ were first aged, followed by the addition of triethylene diamine, gave a rate of 0.66 pound per gallon per hour.

*Example X*

The procedure of Example VI was followed, except that the level of unwashed and undried ER TiCl₃, which was obtained by reducing TiCl₄ with ethyl aluminum dichloride in a 1:3 ratio, was 0.12 gram per 100 cc. of hexane, and the ratio of aluminum to titanium to triethylene diamine was 3.7:1:1.4. The rate of polymerization was 0.58 pound per gallon per hour.

*Example XI*

In this run ethyl aluminum dichloride was reacted in hexane with titanium tetrachloride in a 3:1 molar ratio. A red precipitate was formed, having the composition TiCl₃·AlCl₃. This slurry was charged to the reactor and sufficient triethylene diamine was added to yield a mol ratio of TiCl₃ to triethylene diamine of 1:0.73. The level of ER TiCl₃ obtained in this manner in the reactor was 0.12 gram per 100 cc. of hexane, and the polymerization procedure of Example VI was followed. The rate of polymerization was 0.49 pound of pentane-insoluble polypropylene per gallon of hexane per hour.

*Example XII*

The procedure of Example XI was followed, except that the slurry and triethylene diamine were aged at 70° C. for one-half hour prior to charging to the reactor. The rate of polymerization was 0.78 pound of polypropylene per gallon of hexane per hour.

*Example XIII*

Example XII was repeated, except that the amount of triethylene diamine was increased to an amount such that the TiCl₃/triethylene diamine ratio was 1/0.90. The rate of polymerization was 0.74 pound of pentane-insoluble polymer per gallon of hexane per hour.

*Example XIV*

In this run ERA TiCl₃ was used. The ERA TiCl₃ level was 0.10 gram per 100 cc. of hexane, and the ratio of ethyl aluminum dichloride to TiCl₃ in the ERA TiCl₃ to triethylene diamine was 3.8:1:1.42. Otherwise, the procedure of Example VI was followed. The rate of polymerization was 0.91 pound of pentane-insoluble polypropylene per gallon of hexane per hour.

*Example XV*

Example XIV was repeated except that the catalyst level was reduced to 0.05 gram of ERA TiCl₃ per 100 cc. of hexane. The rate of polymerization was 0.56 pound per gallon per hour.

*Example XVI*

Example XIV was repeated, except that the catalyst level was reduced to 0.035 gram of ERA TiCl₃ per 100 cc. of hexane, and the ethyl aluminum dichloride to TiCl₃ to triethylene diamine mol ratio was 3.8:1:1.89. The rate of polymerization was 0.52 pound per gallon per hour. Substituting AA TiCl₃ for ERA TiCl₃ at a catalyst level of 0.069 gram of AA TiCl₃ per 100 cc. and at a level of 0.048 gram per 100 cc. of hexane, and at the mol ratios of catalyst components of this example resulted in a yield of only traces of pentane-insoluble polymer.

A further series of runs was made to test the effect of varying the mol ratio of ethyl aluminum dichloride (EADC) during the reduction step. Reaction conditions were 100 p.s.i.g. propylene pressure, 22 p.p.m hydrogen and 160° F. The catalyst system was prepared by adding the EADC to a solution of TiCl₄ in hexane, aging 10 min. at 10° C., one hour at room temperature and 16 hours at 72° C., adding triethylene diamine, and aging at 70° C. for an additional one-half hour. The resultant slurry was charged to the reactor, along with additional hexane in an amount such that 0.12 gram of the ER TiCl₃ were present in the reaction mixture per 100 cc. of hexane. Results of these runs are set forth in the following table. The mol ratio of EADC to TiCl₃ to triethylene diamine (TED) in the polymerization step is based on the assumption that one mol of ethyl aluminum dichloride is consumed in the reduction of TiCl₄ to TiCl₃. Soluble polymer refers to that portion of the polymer which is soluble in boiling pentane, and insoluble polymer refers to the polymer insoluble in boiling pentane.

TABLE I

| Reduction Step Mol Ratio EADC/TiCl₄ | Polymerization Step Mol Ratio EADC/TiCl₃/TED | Percent Soluble Polymer | Insoluble Polymer Rate, lbs./hr./gallon |
|---|---|---|---|
| 1.5/1 | 0.5/1/0.22 | 14.3 | 0.21 |
| 1.75/1 | 0.75/1/0.36 | 13.6 | 0.42 |
| 2/1 | 1/1/0.57 | 13.0 | 0.54 |
| 3/1 | 2/1/0.90 | 11.7 | 0.74 |
| 4/1 | 3/1/1.39 | 14.9 | 0.93 |

The effect of temperature in the aging step after reduction was also investigated. The conditions of reduction and polymerization were the same as in the runs of Table I, except that the temperature of the aging step, prior to the addition of TED, were varied. Results of these runs are set in the following table.

TABLE II

| Aging Temp.,° C. | Polymerization Step EADC/TiCl₃/TED | Percent Soluble Polymer | Insoluble, lbs./hr./gallon |
|---|---|---|---|
| 25 | 1/1/0.47 | 20.4 | 0.46 |
| 72 | 1/1/0.47 | 14.1 | 0.45 |
| 90 | 1/1/0.47 | 12.2 | 0.58 |
| 100 | 1/1/0.43 | 8.2 | 0.67 |
| 120 | 1/1/0.43 | 5.7 | 0.44 |

As may be observed from the foregoing data, increased temperatures in the aging step markedly lowers the production of the unwanted pentane soluble polymer, and in addition, up to a certain point, the rate of reaction is increased.

The invention claimed is:

1. A process for the polymerization of alpha olefins having no branching at the 2 position which comprises contacting the olefin, in an inert hydrocarbon solvent, with at least a catalytic amount of a catalyst system formed by admixing the following materials:
   (A) an alkyl aluminum dihalide
   (B) triethylene diamine, and
   (C) a titanium chloride selected from the group consisting of AA titanium trichloride, ER titanium trichloride, and ERA titanium trichloride, as hereinbefore defined, the mol ratio of (A) to (B) being from about 1.5:1 to 10:1, and the mol ratio of (A) to (C) being from about 0.5:1 to 10:1.

2. The process according to claim 1 in which the alkyl aluminum halide component of the catalyst system is ethyl aluminum dichloride.

3. The process according to claim 1 in which the alpha olefin is propylene.

4. The process according to claim 1 in which the mol ratio of alkyl aluminum halide to triethylene diamine is from about 2:1 to 5:1.

5. A catalyst system which consists essentially of the product obtained by mixing the following materials:
   (A) an aluminum alkyl dihalide
   (B) triethylene diamine, and
   (C) a titanium chloride selected from the groups consisting of AA titanium trichloride, ER titanium trichloride and ERA titanium trichloride as hereinbefore defined, the mol ratio of (A) to (B) being from about 1.5:1 to 10:1, and the mol ratio of (A) to (C) being from about 0.5:1 to 10:1.

6. The composition according to claim 5 in which the alkyl aluminum halide component of the catalyst is ethyl aluminum dichloride.

7. The composition according to claim 5 in which the mol ratio of alkyl aluminum halide to triethylene diamine is from 2:1 to 5:1.

8. A method for preparing a polymerization catalyst which comprises the steps of reacting titanium tetrachloride, in solution in a hydrocarbon solvent, with a molar excess of an alkyl aluminum dihalide, aging the resultant slurry at a temperature in excess of 25° C. for a period of at least one-half hour, and adding triethylene diamine to the slurry.

References Cited by the Examiner
UNITED STATES PATENTS

| | | | |
|---|---|---|---|
| 2,954,367 | 9/1960 | Vandenberg | 260—94.9 |
| 2,996,459 | 8/1961 | Andersen et al. | 260—94.9 |
| 3,032,510 | 5/1962 | Tornqvist et al. | 260—94.9 |
| 3,099,647 | 7/1963 | Jezl | 260—94.9 |

JOSEPH L. SCHOFER, *Primary Examiner.*

M. B. KURTZMAN, *Assistant Examiner.*